United States Patent
Ishiwatari et al.

[11] Patent Number: 5,078,223
[45] Date of Patent: Jan. 7, 1992

[54] RADIATOR DEVICE FOR A VEHICLE

[75] Inventors: Makoto Ishiwatari, Tokyo; Akio Handa, Saitama; Takeshi Kobayashi, Tokyo; Takerou Shibukawa, Saitama, all of Japan

[73] Assignee: Honda Giken Kogyo Kabushiki Kaisha, Tokyo, Japan

[21] Appl. No.: 682,875

[22] Filed: Apr. 8, 1991

Related U.S. Application Data

[63] Continuation of Ser. No. 406,096, Sep. 12, 1989, abandoned.

[30] Foreign Application Priority Data

Sep. 12, 1988 [JP] Japan .................. 63-228145

[51] Int. Cl.5 ............................................. B60K 11/04
[52] U.S. Cl. ................................ 180/68.1; 123/41.49; 180/68.4
[58] Field of Search .............. 180/68.1, 68.4, 68.6; 123/41.7, 41.49, 41.27; 165/41, 51; 296/180.1, 206, 208

[56] References Cited

U.S. PATENT DOCUMENTS

| | | | |
|---|---|---|---|
| 4,304,314 | 12/1981 | Sakaguchi et al. | 165/41 |
| 4,387,671 | 6/1983 | Jarvis | 123/41.27 |
| 4,587,750 | 5/1986 | Larson | 180/68.1 |
| 4,771,844 | 9/1988 | Bassett | 180/68.1 |
| 4,828,017 | 5/1989 | Watanabe et al. | 165/41 |

FOREIGN PATENT DOCUMENTS

| | | |
|---|---|---|
| 58-89422 | 5/1983 | Japan ............... 180/68.4 |
| 62-106190 | 5/1988 | Japan . |
| 63-106320 | 5/1988 | Japan . |

Primary Examiner—Andres Kashnikow
Assistant Examiner—Eric Culbreth
Attorney, Agent, or Firm—Lyon & Lyon

[57] ABSTRACT

A radiator device particularly adapted for use on off-road type vehicles includes a radiator body disposed rearwardly of the seat and spatially offset therefrom. The radiator body is enclosed about its periphery by a shroud that includes laterally extending, air-gathering wings. Fins forming part of a lattice-like grill are inclined in the direction of offset of the radiator body to direct the gathered air into the radiator body.

12 Claims, 6 Drawing Sheets

RADIATOR DEVICE FOR A VEHICLE

This application is a continuation of application Ser. No. 406,096, filed Sept. 12, 1989, now abandoned.

BACKGROUND OF THE INVENTION

The present invention relates to a radiator device adapted to be mounted on an off-road running vehicle, such as a so-called "dune buggy" or the like.

A radiator device adapted to be mounted on such as off-road running vehicle is primarily required to be located at a position where good heat transfer can be obtained. It is additionally required to be located at a position where protection from external obstacles can be ensured in the special situation where the vehicle is intended to run off road.

The above-mentioned requirements have been met to some extent by some techniques as described below. One of the techniques is disclosed in Japanese Patent Laid-Open Publication No. 63-106190, in which the radiator device is located between a center roll bar standing at a substantially central position of a vehicle body and a rear roll bar extending down to the rear end of the vehicle body, and wherein the radiator device is offset in a lateral direction of the vehicle with respect to a seat located ahead of the radiator device.

Another technique is disclosed in Japanese Patent Laid-Open Publication No. 63-106320, in which the radiator device is located between the center roll bar and the rear roll bar as mentioned above, and a radiator body of the radiator device is covered with a shroud for gathering the wind.

While the above-mentioned prior art radiator devices are improvements from the standpoint of protection from external obstacles, they yet have problems from the standpoint of heat transfer.

Although the radiator body is offset from the seat, or it is covered with the shroud in order to gather the wind as much as possible, a satisfactory effect cannot be actually obtained by these arrangements alone.

SUMMARY OF THE INVENTION

It is an object of the present invention to provide a radiator device adapted to be mounted on a vehicle, especially an off-road running vehicle, such as a dune buggy which can be protected from external obstacles and that obtains improved heat transfer.

According to the present invention, there is provided an on-vehicle radiator device comprising a radiator body located behind a seat disposed at a substantially central position of a vehicle body, the radiator body being offset in a lateral or vertical direction of the vehicle body with respect to the seat, and a wind guiding device located in front of the radiator body with respect to the forward direction of the vehicle body, the wind guiding device having wind-gathering baffles and a plurality of fins inclined at their front ends so as to be oriented in a direction coincident with the offset direction of the radiator body.

As the radiator body is offset from the seat, the cooling wind is gathered more from the offset side during running of the vehicle. The cooling wind flowing toward the radiator body from the offset side is changed in its flow direction and straightened by the fins of the wind guiding device so as to be directed to the radiator body. Accordingly, the efficiency of gathering the cooling wind is improved to thereby ensure good heat transfer.

For a better understanding of the invention, its operating advantages and the specific objectives obtained by its use, reference should be made to the accompanying drawings and description which relate to a preferred embodiment thereof.

DETAILED DESCRIPTION OF THE PREFERRED EMBODIMENT

Figure 1:
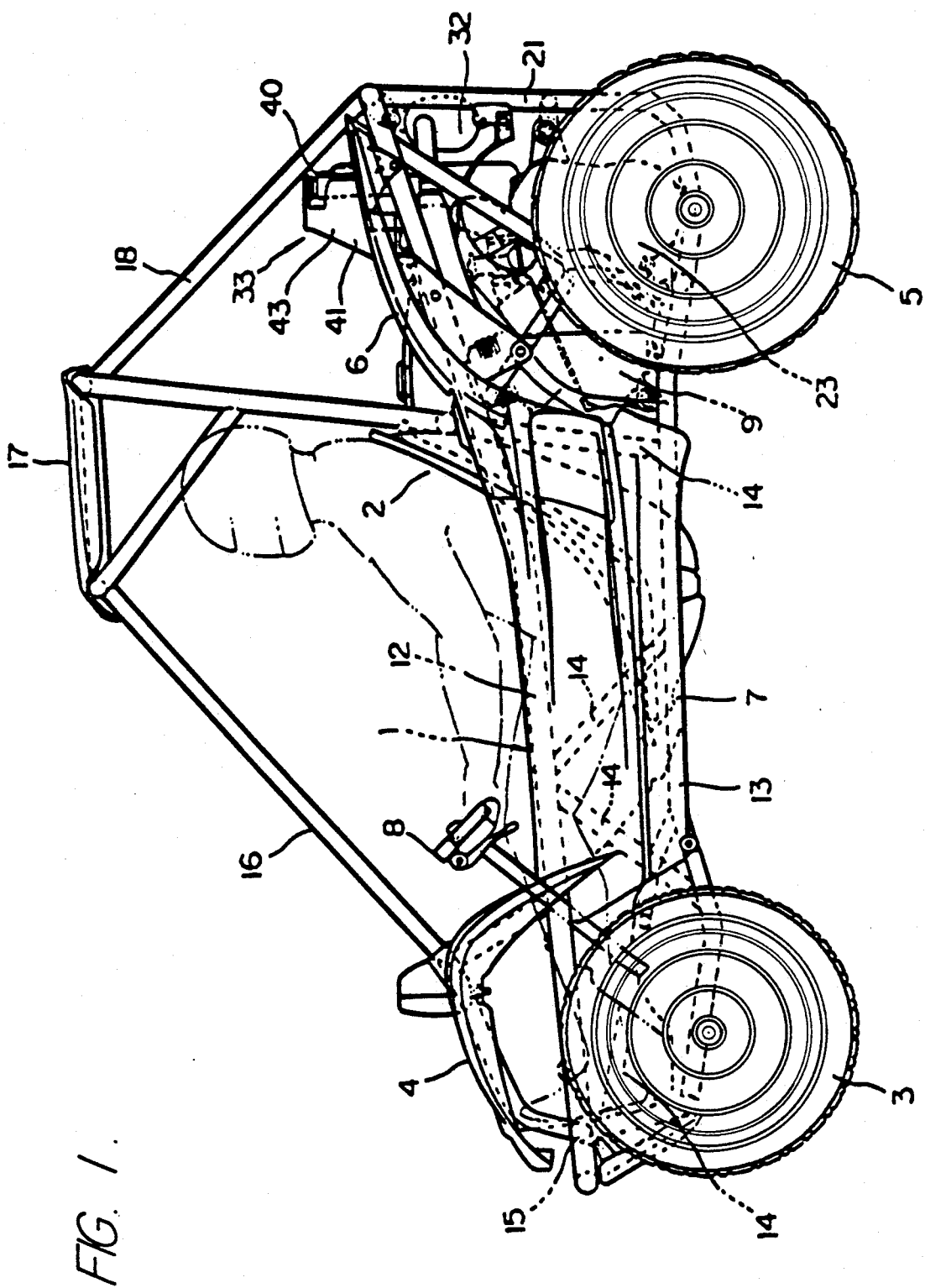
FIG. 1 is an elevational view of an off-road type vehicle incorporating a radiator device according to the present invention.

Referring to FIGS. 1 to 4, the off-road running vehicle which, as shown, is of the so-called "dune buggy" type, includes a vehicle body frame 1 forming a skeleton of a vehicle body, a driver's seat 2 located at a substantially central position of the vehicle body, a pair of right and left front wheels 3 supported through suspensions to the vehicle body frame 1 at a front portion thereof, a pair of front fenders 4 mounted to the vehicle body frame 1 so as to cover upper and side portions of the front wheels 3, a pair of right and left rear wheels 5 supported through suspensions to the vehicle body frame 1 at a rear portion thereof, a pair of rear fenders 6 mounted to the vehicle body frame 1 so as to cover upper and side portions of the rear wheels 5, a pair of side panels 7 each extending between each front fender 4 and each rear fender 6 on the same side, a steering handle 8 provided at the front portion of the vehicle body frame 1 for steering the front wheels 2, and an engine 9 mounted behind the seat 2.

The vehicle body frame 1 includes a pair of upper main pipes 12 extending longitudinally of the vehicle body on opposite sides thereof, a pair of lower main pipes 13 extending longitudinally of the vehicle body on opposite sides thereof, a plurality of reinforcing pipes 14 for obliquely connecting the respective upper and lower main pipes 12 and 13 on opposite sides, and a plurality of cross members 15 for interconnecting the right and left upper main pipes 12 and interconnecting the right and left lower main pipes 13. Thus, the vehicle body frame 1 is formed substantially symmetrically with respect to the longitudinal center axis of the vehicle.

A pair of front roll bars 16 extend upwardly and rearwardly from the front portion of the vehicle body frame 1, and a pair of rear roll bars 18 extend upwardly and forwardly from the rear portion of the vehicle body frame 1. A center roll unit 17 is provided to extend upwardly from the central portion of the vehicle body frame 1 and is connected with the front roll bars 16 and the rear roll bars 18, thus covering the overhead of a driver sitting in the seat 2.

Figure 3:
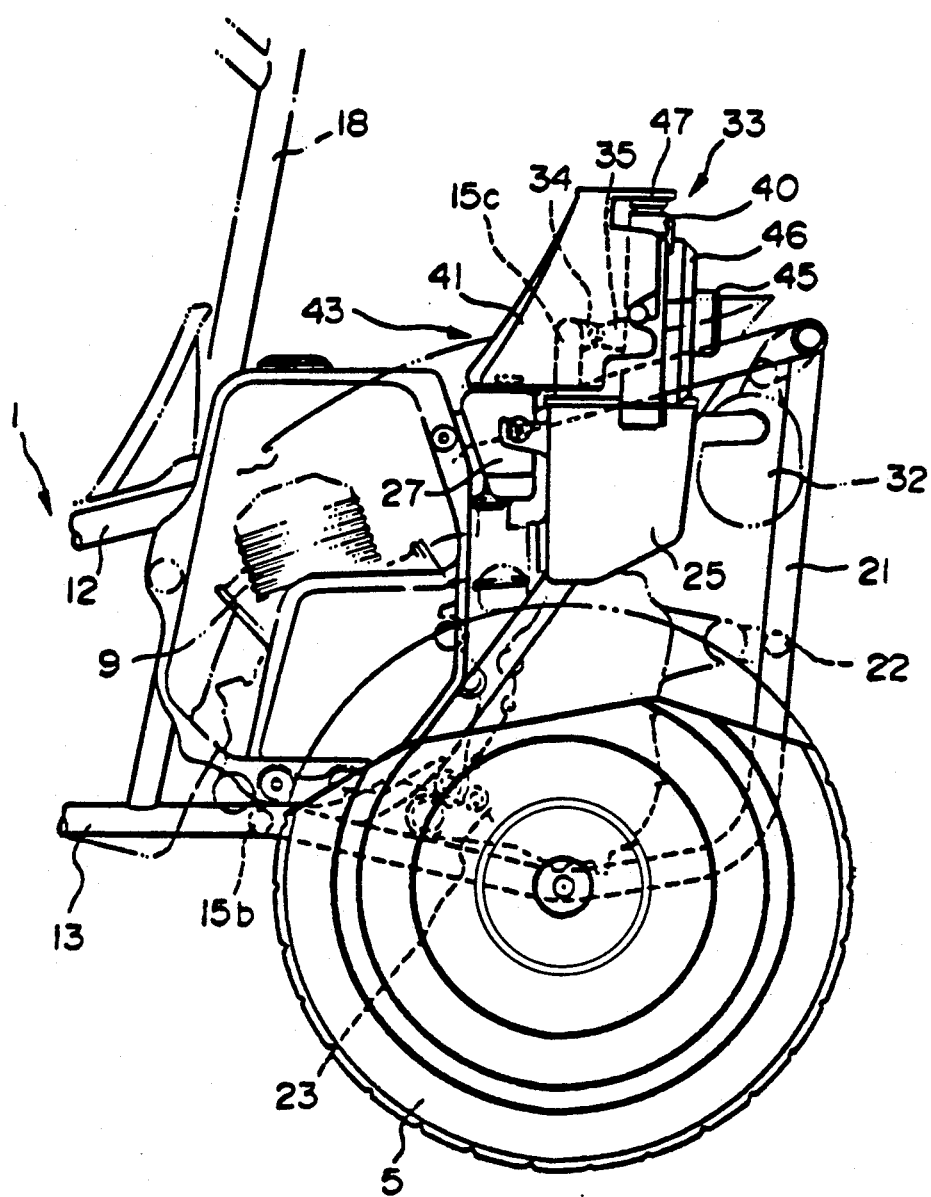
FIG. 3 is an enlarged elevational view of the rear portion of the vehicle of FIG. 1.
Figure 4:
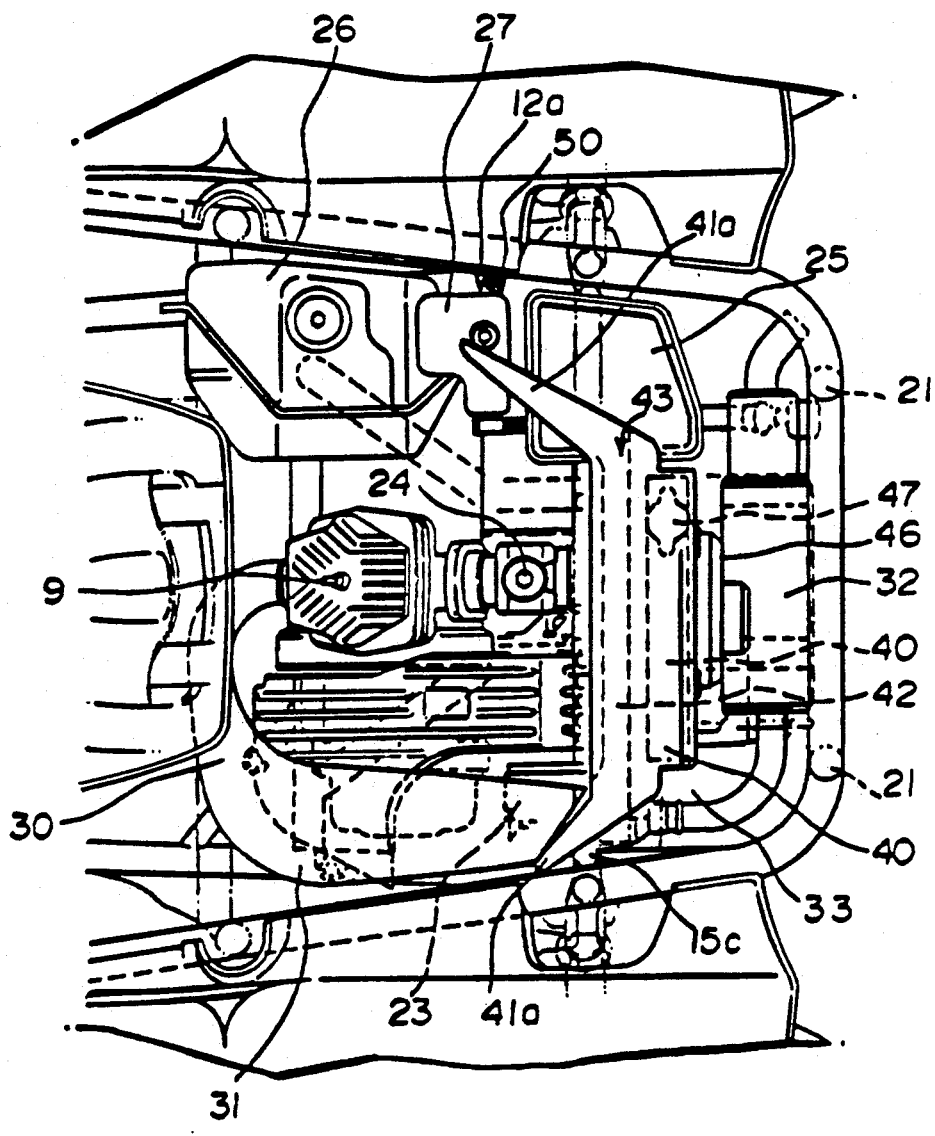
FIG. 4 is a plan view of the portion of the vehicle shown in FIG. 3.
Figure 5:
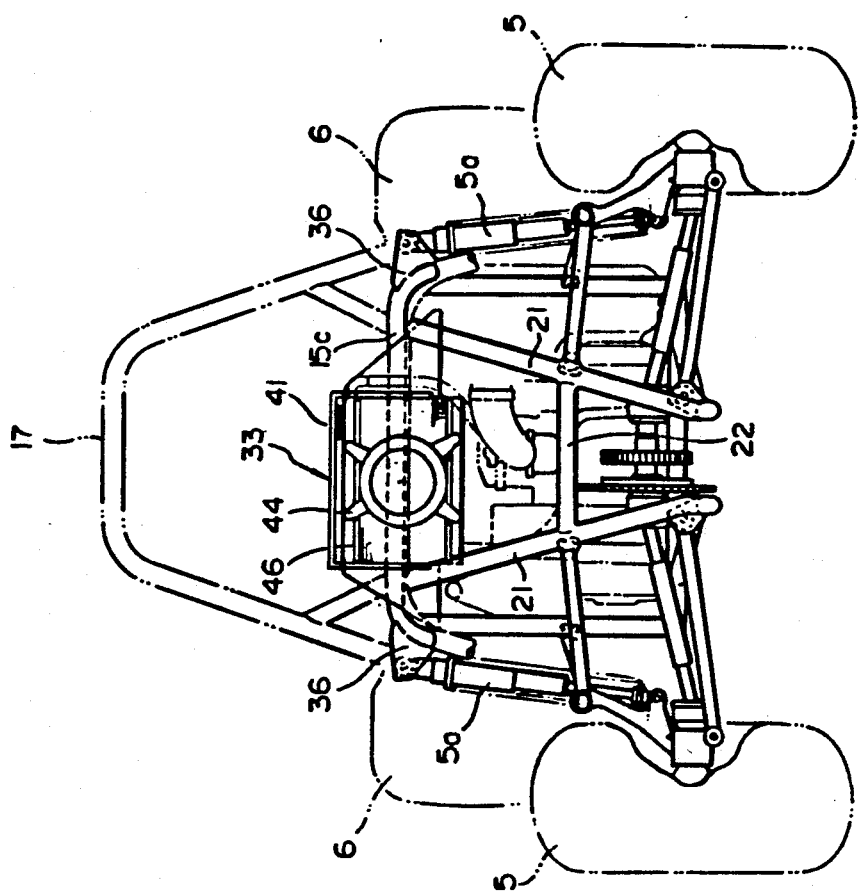
FIG. 5 is a rear elevational view of the vehicle of FIG. 1.

The engine 9 and engine accessories are arranged at the rear portion of the vehicle body frame 1 in the following manner. As shown in FIGS. 3 to 5, a pair of rear pipes 21 are connected at their front ends to the cross member 15b extending between the right and left lower main pipes 13 at the rear end thereof. The rear pipes 21, being slightly inclined inwardly, extend rearwardly to the rear end of the vehicle body and then extend inwardly along the rear axle, rising thereafter to the right and left upper main pipes 12. The upper ends of the rear pipes 21 are connected to the upper main pipes 12, and a cross member 22 is connected between the rising portions of the rear pipes 21 (FIG. 5).

Thus, the rear portion of the vehicle body is surrounded at its peripheral side by the main pipes 12 and 13, the rear pipes 21 and the cross member 22, and is also surrounded at its upper periphery by the center roll unit 17 and the rear roll bars 18. The engine 9 and the engine accessories, such as a transmission 23, a carburetor 24 and an air cleaner 25, are located in the rear portion of the vehicle body in such a manner as to be supported by the pipe members constituting the vehicle body frame 1.

As shown in FIG. 4, the engine 9 is located at a central position in the rear portion of the vehicle body, and the transmission 23 is located behind the engine 9 in connection therewith. There are arranged on the right side of the engine 9 a fuel tank 26, a radiator reservoir tank 27 and an air cleaner 25, in this order. A suction pipe (not shown) extending from the air cleaner 25 is connected to the carburetor 24, and a communication pipe extending from the carburetor 24 is connected to suction ports of the engine 9.

Figure 2:
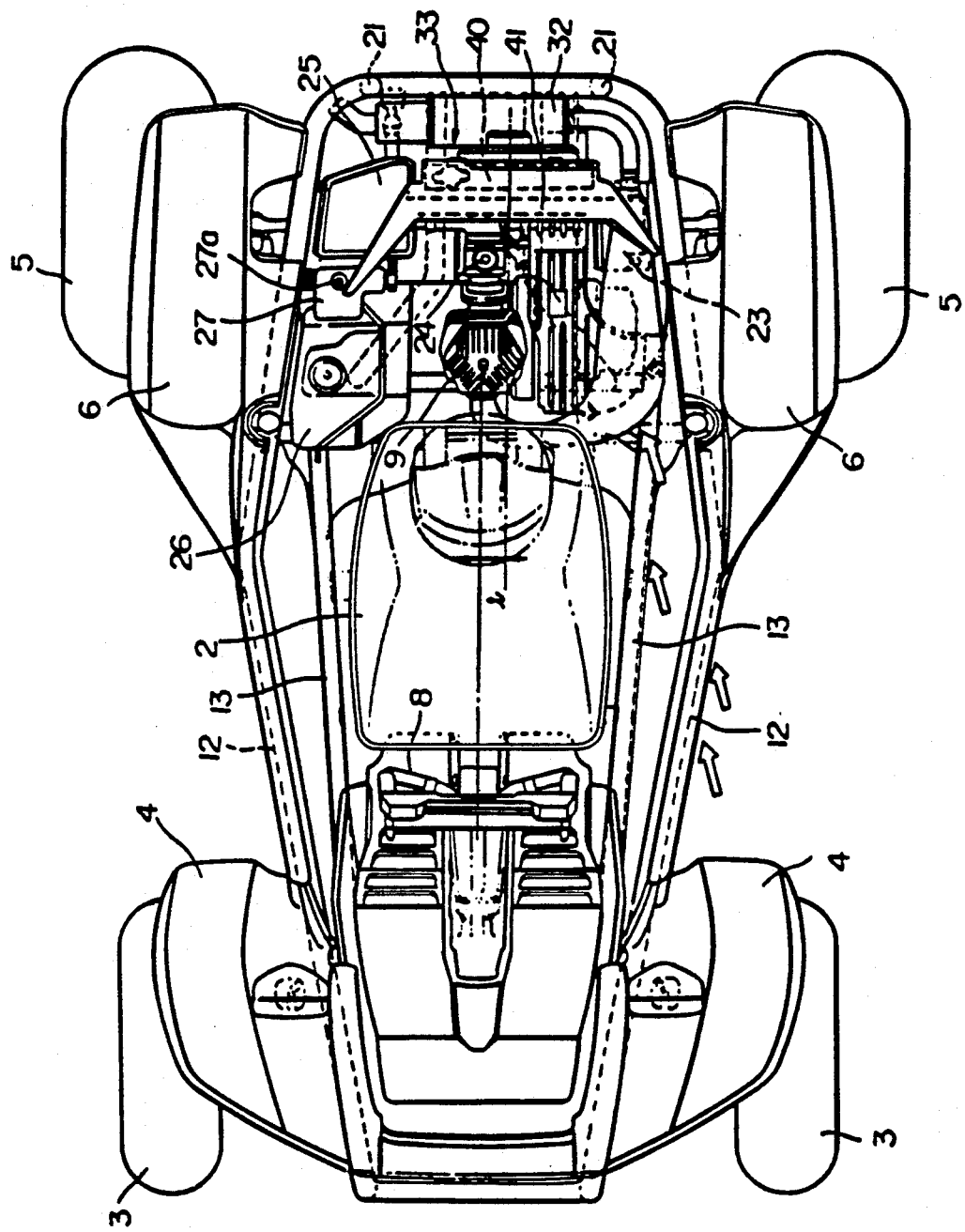
FIG. 2 is a plan view of the vehicle of FIG. 1.

An exhaust pipe 30 is connected to exhaust ports formed at a front end of the engine 9, and is curved leftwardly to be connected to a chamber 31 located on the left side of the engine 9. The chamber 31 is connected to a muffler 32 located on the rear side of the engine 9. A radiator device 33 is located behind and above the engine 9 in front of the muffler 32. The radiator device indicated generally 33 is an assemblage of elements defined hereinafter that is supported through a pair of brackets 35 to a pair of stays 34 extending from a U-shaped cross pipe 15c connected between the right and left upper main pipes 12 at the rear portion thereof (FIG. 3). More specifically, the radiator device 33 is positioned in such manner that the longitudinal center axis thereof is offset to the left side from the longitudinal center axis of the seat 2 by a distance t as shown in FIG. 2. As shown in FIG. 5, a pair of shock absorbers 5a supporting the rear wheels 5 are supported at their upper ends through a pair of brackets 36 to the cross pipe 15c at its right and left ends.

Figure 6:
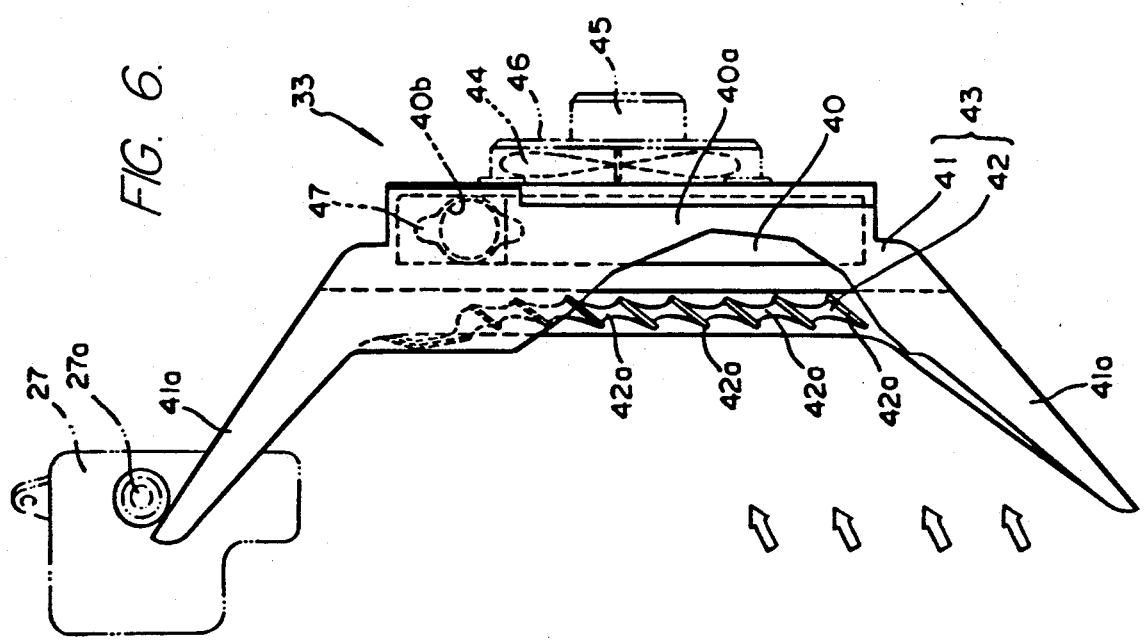
FIG. 6 is a plan, partially broken, view of the radiator device.

As shown in FIG. 6, the radiator device 33 includes a radiator body 40, a wind guiding device 43 consisting of a shroud 41 and a radiator grill 42, a fan 44, a fan motor 45, and a fan cover 46. The radiator body 40 is constructed of a radiator core 40a for actually effecting heat exchange, and upper and lower tanks connected to the engine 9. The upper tank is formed on its upper surface at its right end with a radiator filler 40b closed by a removable filler cap 47.

The shroud 41 of the wind guiding device 43 is so provided as to cover the right and left sides and the upper side of the radiator body as shown in FIGS. 3 and 6. The shroud 41 is formed with a pair of right and left wing-like extension baffles 41a extending obliquely forwardly, so that the wind flowing aside the radiator body 40 is gathered into the radiator body 40 by the baffles 41a of the shroud 41. In particular, the right extension baffles 41a is so disposed as to cover a front side of a filler cap 27a of the radiator reservoir tank 27.

The radiator grill 42 is formed by a plurality of vertical and horizontal fins 42a intersecting at given intervals in a lattice-like manner. Particularly, the vertical fins 42a are so-inclined at their front ends as to be oriented in a direction coincident with the offset direction of the radiator body 40, that is, oriented to the left side as shown in FIG. 6.

Figure 7:
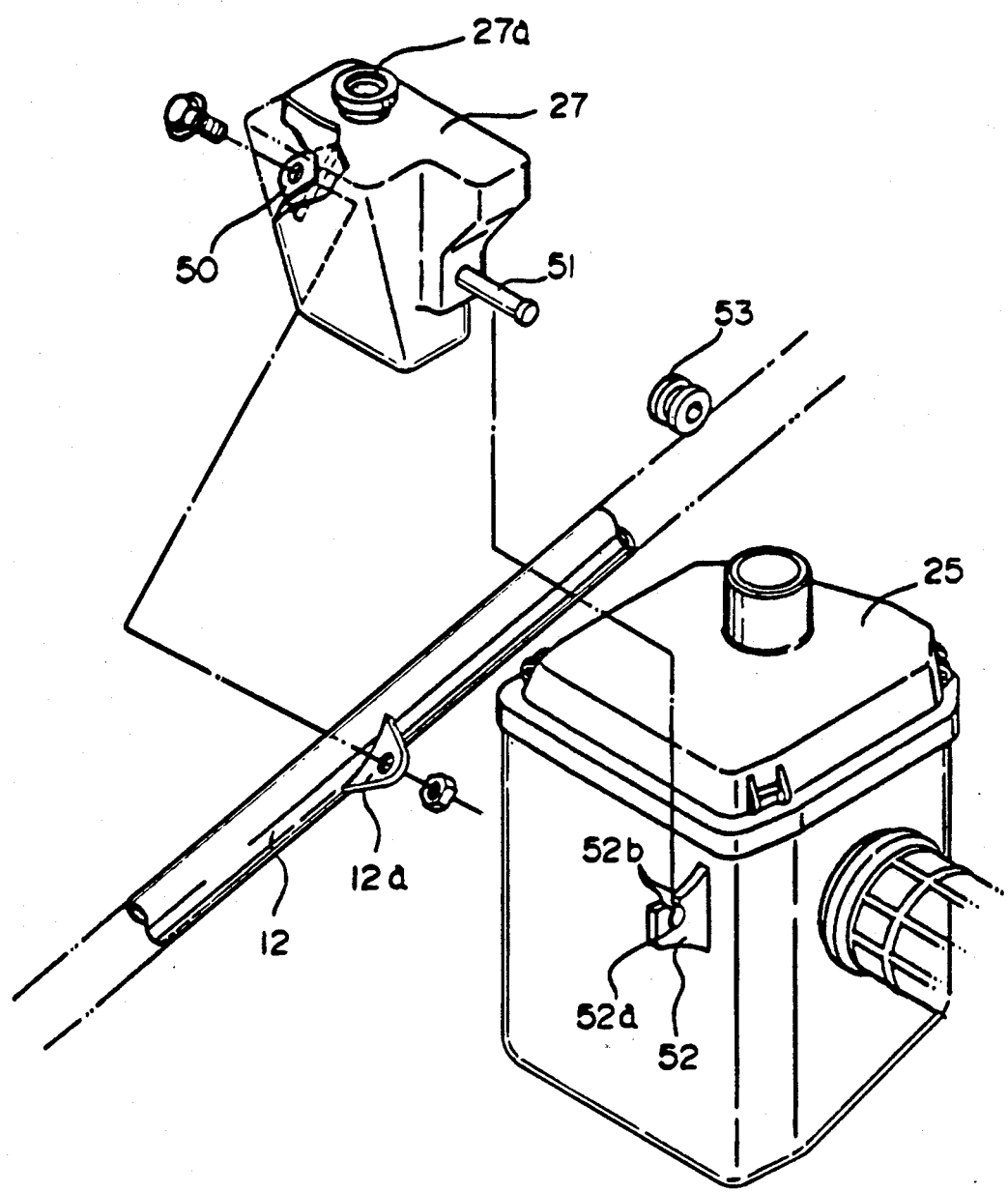
FIG. 7 is an exploded partial perspective view of the mounting structure for the radiator reservoir tank.

Referring to FIGS. 3, 4 and 7, the radiator reservoir tank 27 is integrally formed with a bracket 50 projecting rightwardly therefrom. The bracket 50 is bolted to a stay 12a extending from the right main pipe 12. The radiator reservoir tank 27 is also integrally formed with a pin 51 projecting leftwardly. The pin 51 is supported through a rubber grommet 53 to an arm 52 extending from the air cleaner 25. Thus, the radiator reservoir tank 27 is mounted to the vehicle body. The arm 52 is formed with a cutout 52a for inserting therein the pin 51, and the cutout 52a is formed with a pair of opposed open edges 52b for preventing disengagement of the pin 51 inserted in the cutout 52a. Thus, the reservoir tank 27 is supported at its opposite sides, on of which being supported by the arm 52 of the air cleaner 25. Therefore, the reservoir tank 27 is relatively firmly supported by a reduced number of parts.

As mentioned above, the radiator device 33 is located behind the seat 2 and surrounded by the frame elements 12, 17, 18, 21, etc. Therefore, the radiator device 33 can be protected from being damaged by external obstacles. Further, as the radiator body 40 of the radiator device 33 is offset to the left side with respect to the seat 2, the cooling wind can be positively induced from the left side of the seat 2 to the radiator body 40. Furthermore, as the fins 42a of the radiator grill 42 are so-inclined as to be oriented in a direction coincident with the offset direction of the radiator body 40, the cooling wind flowing into the radiator device 33 is changed in its flow direction and straightened by the fins 42a so as to be directed to the radiator body 40. Therefore, good heat transfer from the radiator body 40 to the cooling wind can be ensured.

Additionally, the radiator filler 40b of the radiator body 40 and the filler of the radiator reservoir tank 27 are covered on their front side by the shroud 41.

Although in the described embodiment the radiator device 33 is offset to the left side with respect to the seat 2, it may alternatively be offset to the right side or in the vertical direction. In this case, it should be appreciated that the fins 42a of the radiator grill 42 must be so inclined as to be oriented in a direction coincident with the offset direction of the radiator body 40.

It should be further understood that, although a preferred embodiment of the invention has been illustrated and described herein, changes and modifications can be made in the described arrangement without departing from the scope of the appended claims.

We claim:
1. A vehicle comprising
   a frame including an assemblage of pipes forming a substantially open vehicle body and a seat mounted in said vehicle body;
   a radiator mounted to said body behind said seat;
   a wind guiding device including baffles mounted to either side and extending outwardly and forwardly of said radiator to laterally outwardly of said seat and fins substantially vertically arranged in front of said radiator, at least a plurality of said fins extending forwardly and outwardly from in front of said radiator to receive air from around said seat and laterally displaced from a said baffle with the vehicle moving in a forward direction.

2. The vehicle of claim 1 further comprising
an air cleaner;
a radiator reservoir tank;
means for securing said air cleaner and said radiator reservoir tank to said frame, said means including a bracket integrally formed on said radiator reservoir tank and arranged for bolted connection to said frame, a pin integrally connected to said radiator reservoir tank and extending in the direction of said air cleaner and means on said air cleaner for mountedly receiving said pin.

3. The vehicle of claim 2 in which said pin receiving means includes an arm extending from said air cleaner, an opening in said arm for reception of said pin, and a slot communicating with said opening and extending from said opening to an edge of said arm to accommodate passage of said pin.

4. The vehicle of claim 3 including a grommet formed of flexible material enclosing said pin, said grommet containing an annular recess for reception in said arm.

5. A vehicle comprising
a frame including an assemblage of pipes forming a substantially open vehicle body and a seat mounted in said vehicle body;
a radiator mounted to said body behind and offset from the center of said seat;
a wind guiding device including baffles mounted to either side and extending outwardly and forwardly of said radiator to laterally outwardly of said seat and fins substantially vertically arranged in front of said radiator, at least a plurality of said fins extending in the direction of said offset from in front of said radiator to receive air from around said seat and laterally displaced from a said baffle with the vehicle moving in a forward direction.

6. The vehicle of claim 5 further comprising
an air cleaner;
a radiator reservoir tank;
means for securing said air cleaner and said radiator reservoir tank to said frame, said means including a bracket integrally formed on said radiator reservoir tank and arranged for bolted connection to said frame, a pin integrally connected to said radiator reservoir tank and extending in the direction of said air cleaner and means on said air cleaner for mountedly receiving said pin.

7. The vehicle of claim 6 in which said receiving means includes an arm extending from said air cleaner, an opening in said arm for reception of said pin, and a slot communicating with said opening and extending from said opening to an edge of said arm to accommodate passage of said pin.

8. The vehicle of claim 7 including a grommet formed of flexible material enclosing said pin, said grommet containing an annular recess for reception in said arm.

9. A vehicle comprising
a frame including an assemblage of pipes forming a substantially open vehicle body and a seat mounted in said vehicle body;
a radiator mounted to said body behind and offset from the center of said seat;
a wind guiding device including a baffle mounted to the side of said radiator in the direction of said offset and extending outwardly and forwardly of said radiator to laterally outwardly of said seat and fins substantially vertically arranged in front of said radiator, at least a plurality of said fins extending in the direction of said offset from in front of said radiator to receive air from around said seat and laterally displaced from said baffle with the vehicle moving in a forward direction.

10. The vehicle of claim 9 further comprising
an air cleaner;
a radiator reservoir tank;
means for securing said air cleaner and said radiator reservoir tank to said frame, said means including a bracket integrally formed on said radiator reservoir tank and arranged for bolted connection to said frame, a pin integrally connected to said radiator reservoir tank and extending in the direction of said air cleaner and means on said air cleaner for mountedly receiving said pin.

11. The vehicle of claim 10 in which said pin receiving means includes an arm extending from said air cleaner, an opening in said arm for reception of said pin, and a slot communicating with said opening and extending from said opening to an edge of said arm to accommodate passage of said pin.

12. The vehicle of claim 11 including a grommet formed of flexible material enclosing said pin, said grommet containing an annular recess for reception in said arm.

* * * * *